United States Patent
Katz et al.

(10) Patent No.: US 12,471,569 B2
(45) Date of Patent: Nov. 18, 2025

(54) SYSTEMS AND METHODS FOR DETERMINING FEED INTAKE OF CATTLE

(71) Applicant: Afimilk Agricultural Cooperative Ltd., Kibbutz Afikim (IL)

(72) Inventors: Gil Katz, Kibbutz Afikim (IL); Roni Shlomo Yair, Kfar Tavor (IL)

(73) Assignee: AFIMILK AGRICULTURAL COOPERATIVE LTD., Kibbutz Afikim (IL)

(*) Notice: Subject to any disclaimer, the term of this patent is extended or adjusted under 35 U.S.C. 154(b) by 421 days.

(21) Appl. No.: 18/109,367

(22) Filed: Feb. 14, 2023

(65) Prior Publication Data

US 2023/0284595 A1    Sep. 14, 2023

(51) Int. Cl.
*A01K 29/00* (2006.01)
*A01K 11/00* (2006.01)
*G06Q 50/02* (2012.01)

(52) U.S. Cl.
CPC .......... *A01K 29/005* (2013.01); *A01K 11/004* (2013.01); *G06Q 50/02* (2013.01)

(58) Field of Classification Search
CPC .. A01K 11/004; A01K 29/005; A01K 11/006; A01K 11/008; A01K 29/00; G05B 2219/45017; G01N 33/04
USPC .......................................................... 700/28
See application file for complete search history.

(56) References Cited

U.S. PATENT DOCUMENTS

| | | | |
|---|---|---|---|
| 9,538,729 B2* | 1/2017 | Yarden | A01K 29/005 |
| 10,595,513 B2* | 3/2020 | Halachmi | A01K 29/005 |
| 10,893,663 B2 | 1/2021 | Auer | |
| 2003/0205208 A1* | 11/2003 | Bar-Shalom | A01K 29/005 |
| | | | 119/859 |
| 2019/0141959 A1 | 5/2019 | Ingham et al. | |
| 2022/0104929 A1* | 4/2022 | Cummins | G16H 40/63 |

FOREIGN PATENT DOCUMENTS

| | | | | |
|---|---|---|---|---|
| CN | 105307482 B | * | 4/2019 | ............... A01K 5/02 |
| CN | 110169374 A | * | 8/2019 | ............. A01K 29/00 |
| WO | 2011069512 | | 6/2011 | |
| WO | 2022005288 | | 1/2022 | |

* cited by examiner

*Primary Examiner* — Chun Cao
(74) *Attorney, Agent, or Firm* — The Roy Gross Law Firm, LLC; Roy D. Gross (57) ABSTRACT

A system for determining feed intake of a cow, the system including: at least one sensor configured to be positioned on a collar and/or ear-tag of a cow, wherein the sensor is configured to collect data associated with head movements of the cow, a processor in communication with a memory module, the memory module having stored thereon program code, the program code executable by the processor to: receive signals from the at least one sensor, preprocess the received signals by classifying different time blocks of the received signal into classes of behaviors of the cow, extract a plurality of features based, at least in part, on the classified time blocks, and calculate the feed intake of the cow based on the one or more extracted features.

31 Claims, 3 Drawing Sheets

SYSTEMS AND METHODS FOR DETERMINING FEED INTAKE OF CATTLE

CROSS REFERENCE TO RELATED APPLICATIONS

This application claims the benefit of priority of U.S. Provisional Patent Application No. 63/317,631, filed Mar. 8, 2022, the contents of which are all incorporated herein by reference in their entirety.

TECHNICAL FIELD

The present disclosure relates generally to systems and methods for determining feed intake of cattle.

BACKGROUND

Today, the determination of the feed intake of cattle, such as cows, sometimes includes calculations based on animal factors such as milk energy, body weight (BW), days in milk (DIM) and parity. However, the accuracy of such calculations is generally relatively low and has high slope bias, meaning that the results are more inaccurate in the cows with highest and lowest feed intake. This can be a major issue since identifying these cows is essential to make smart breeding and culling decisions to improve herd efficiency and profitability. Cow monitoring devices that can identify cow eating based on the cow's movement can be helpful, however, as eating rate variability within a herd is very high, the eating time (of the cow) alone is a poor predictor of feed intake. Moreover, tracking movements of the cattle/cow for long periods of time may prove unsustainable with some tracking devices which may need large storage spaces for the detected signals, as well as continuous communication with a far-away receiver. The hardware necessary for such tracking methods may also drain the tracking sensors and deplete them of battery life that needs to last at least a few years on the body of the cattle or cow.

Thus, there is a need in the art for systems and methods for tracking feed intake of a cattle or cow accurately, and which may work continuously years at a time.

SUMMARY

According to some embodiments there is provided herein a system for determining feed intake of a cow, the system including at least one sensor configured to be positioned on a collar and/or ear-tag of a cow, wherein the sensor is configured to collect data associated with head movements of the cow, a processor in communication with a memory module, the memory module having stored thereon program code, the program code executable by the processor to: receive signals from the at least one sensor, preprocess the received signals by classifying different time blocks of the received signal into classes of behaviors of the cow, extract a plurality of features based, at least in part, on the classified time blocks, and calculate the feed intake of the cow based on the one or more extracted features.

According to some embodiments there is provided a method for measuring feed intake of a cow, the method including: receiving signals from at least one sensor positioned on a collar and/or ear-tag of a cow, preprocessing the received signals by classifying different time blocks of the received signal into classes of behaviors of the cow, extracting a plurality of features based, at least in part, on the classified time blocks, and determining the feed intake of the cow by applying at least one algorithm to the one or more extracted features.

According to some embodiments, the processor is further configured to calculate the feed intake without calculating the rumination of the cow.

According to some embodiments, the processor is further configured to determine one or more of the eating time and the eating pace of the cow, and wherein calculating the feed intake of the cow is based, at least in part, on one or more of the eating time and the eating pace of the cow.

According to some embodiments, the program code is further executable by the processor to receive metadata associated with the cow and/or a group of the cow.

According to some embodiments, the metadata includes any one or more of the age of the cow, days from calving, health status of the cow, profile of the cow, weight of the cow, and type of food being consumed by the cow and/or the group, the number of calves the cow has given birth to, how long it takes the cow to get pregnant, and the group number of the group of the cow.

According to some embodiments, the health status of the cow includes any one or more of the pregnancy status of the cow, amount of milk produced by the cow, milk composition of the milk produced by the cow, number of days since last calving, and reported injuries of the cow.

According to some embodiments, the system is further configured to convert the received signal to a representation in the frequency domain.

According to some embodiments, the sensor includes an accelerometer, and wherein the signal is associated with the kinematics of the cow.

According to some embodiments, the received signal includes a resolution of at least one millisecond.

According to some embodiments, the length of each of the time blocks includes about 30 seconds to 5 minutes.

According to some embodiments, the classes of behaviors include any one or more of eating, ruminating, walking, jumping, breathing rate, or any combination thereof.

According to some embodiments, the storage module is configured to store the received signals in one or more clusters, wherein each cluster is associated with a classes of behavior of the cow.

According to some embodiments, the storage module is configured to store the received signals in the collar and/or ear-tag.

According to some embodiments, the processor is configured to send the received signals, from the collar and/or ear-tag to a receiver, every predetermined time period.

According to some embodiments, the predetermined time period includes between about 5 minutes to about 24 hours.

According to some embodiments, the processor is configured to send the received signals, from the collar and/or ear-tag to a receiver, based on a predetermined sending mechanism.

According to some embodiments, the memory module or a portion thereof is located on the collar and/or ear-tag.

According to some embodiments, the method further includes ranking the cow in relation to a group of the cow.

According to some embodiments, the method further includes ranking the group of the cow in relation to other cow groups.

According to some embodiments, the method further includes determining the feed intake of the cow based, at least in part, on the amount of food given to the group of the cow and/or the price of the food given to the group of the cow.

According to some embodiments, the feed intake of the cow includes the feed intake over a period of about one week.

According to some embodiments the method further includes, for a time block classified as eating, determining the feed intake by applying one or more machine learning modules to the time blocks classified as eating time blocks.

According to some embodiments, the method further includes calculating a frequency from the received signal.

According to some embodiments, the frequency is between 1 GHz and 2 GHz. According to some embodiments, the frequency is between 2 GHz and 3 GHz. According to some embodiments, the frequency is between 1 GHz and 3 GHz.

According to some embodiments, the method further includes classifying the time blocks based, at least in part, on the variance of the frequency of the signal within the time blocks.

According to some embodiments, the method further includes clustering a plurality of eating time blocks into one or more meal time block, and wherein determining the feed intake of the cow includes applying at least one algorithm to the one or more extracted features of the data in the meal time block.

According to some embodiments, determining the feed intake includes applying the extracted features to a machine learning algorithm.

According to some embodiments, determining the feed intake of the cow by applying at least one algorithm to the one or more extracted features and one or more additional features.

According to some embodiments, the additional features includes any one or more of metadata of the cow and data associated with the milk produced by the cow, or any combination thereof.

According to some embodiments, the metadata of the cow includes any one or more of the age of the cow, health status of the cow, profile of the cow, weight of the cow, and type of food being consumed by the cow and/or the group, the number of calves the cow has given birth to, how long it takes the cow to get pregnant, and the group number of the group of the cow.

According to some embodiments, the health status of the cow includes any one or more of the pregnancy status of the cow and reported injuries of the cow.

According to some embodiments, the data associated with the milk produced by the cow includes any one or more of the amount of milk produced by the cow, milk composition of the milk produced by the cow, and number of days since last calving.

According to some embodiments, the data associated with milk produced by cow includes data inputted by a user and/or received from a milk sensor.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In block diagrams and flowcharts, optional elements/components and optional stages may be included within dashed boxes.

In the Figures.

DETAILED DESCRIPTION

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without specific details being presented herein. Furthermore, well-known features may be omitted or simplified in order not to obscure the invention.

Figure 1:
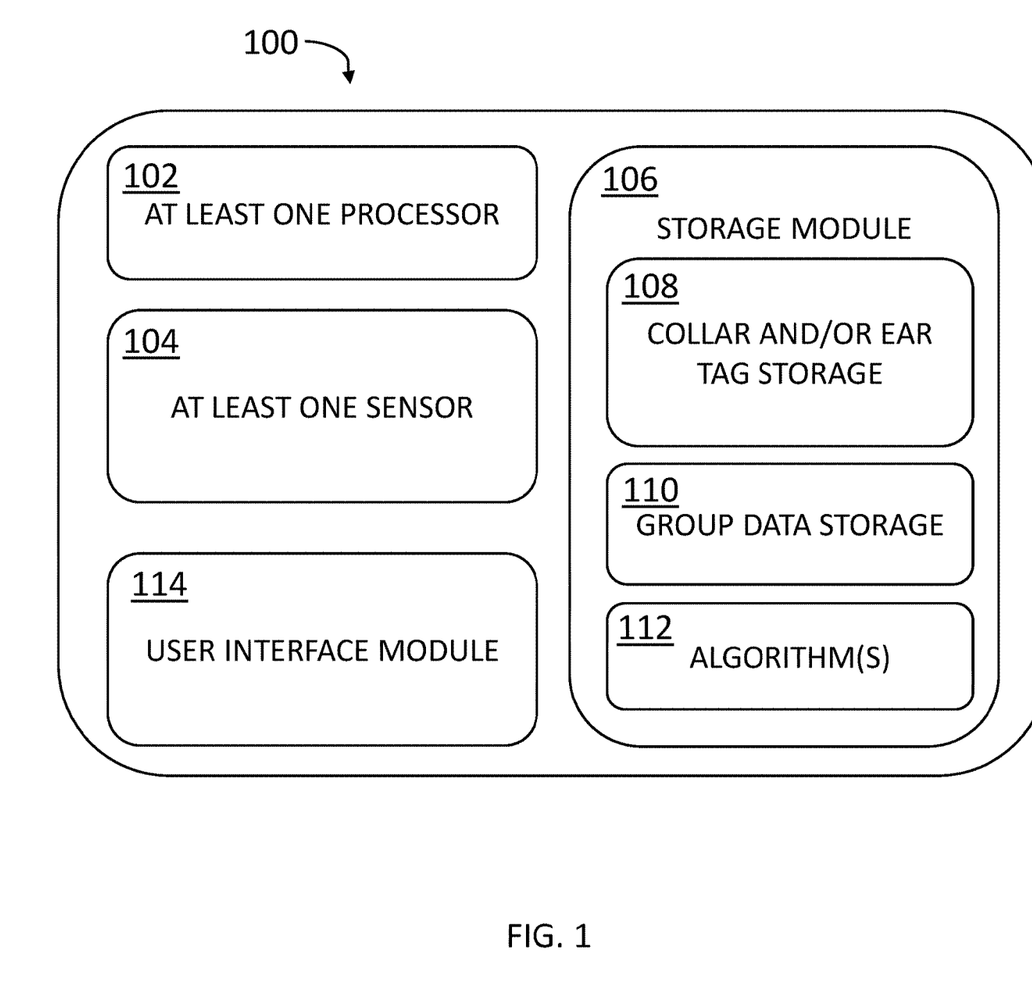
FIG. 1 is a system for determining feed intake of a cow, in accordance with some embodiments of the present invention.

Reference is made to FIG. 1, which shows a system for determining feed intake of a cow, in accordance with some embodiments of the present invention.

According to some embodiments, the system 100 may include at least one sensor 104 in communication with the processor 102. According to some embodiments, the at least one sensor 104 may be positioned on a collar and/or ear-tag of cattle (or a collar and/or ear-tag of a cow). According to some embodiment, the system 100 may include a storage module 106 in communication with the processor 102 and/or the at least one sensor 104. According to some embodiments, the system may include a user interface module 114 in communication with any one or more of the processor 102, the at least one sensor 104, and the storage module 106.

According to some embodiments, the at least one processor 102 may be configured to analyze the signals received from the at least one sensor 104. According to some embodiments, the at least one processor may include a processor embedded in the collar and/or ear-tag of the cattle or cow. According to some embodiments, the at least one processor 102 may include a distant server in communication with the collar and/or ear-tag. According to some embodiments, the at least one processor 102 may be part of a receiving system configured to receive the signals collected by the at least one sensor 104 and analyze the received collected signals.

According to some embodiments, the user interface module 114 may be configured to receive data, such as associated with the cow, from a user and/or other sensors detached from the collar and/or ear-tag. According to some embodiments, the user interface module 114 may include a keyboard, screen, mouse, button, microphone, and the like, or any combination thereof. According to some embodiments, the user interface module 114 may include a smartphone application or software. According to some embodiments, the user interface module 114 may be configured for inputting data associated with the cow and/or group of the cow.

According to some embodiments, the system may include a collar configured to surround a neck of the cattle or cow. According to some embodiments, the collar may include, embedded therein, the at least one processor 102. According to some embodiments, the collar may include, embedded therein, the storage module 106 and/or a portion of the storage module 106, such as, for example, the collar storage 108 portion of the storage module 106.

According to some embodiments, the system may include an ear-tag configured to be positioned on the ear of the cattle or cow. According to some embodiments, the ear-tag may include, embedded therein, the at least one processor 102. According to some embodiments, the ear-tag may include, embedded therein, the storage module 106 and/or a portion of the storage module 106, such as, for example, the ear-tag storage 108 portion of the storage module 106.

According to some embodiments, the at least one sensor 104 may include a sensor positioned on a collar and/or ear-tag of the cow. According to some embodiments, the at least one sensor 104 may include an accelerometer. According to some embodiments, the at least one sensor 104 may include an accelerometer and an additional sensor, such as, a global positioning system (GPS), wherein the accelerometer and the additional sensor are positioned on the collar and/or ear-tag. According to some embodiments, the at least one sensor 104 may be configured to collect data associated with head movements of the cow. According to some embodiments, the at least one sensor 104 may be configured to collect data associated with the kinematics of the cow. According to some embodiments, the at least one sensor 104 may be configured to collect data associate with movements of the cow continuously. According to some embodiments, the at least one sensor 104 may be configured to send the collected data associated with the movements of the cow, to the storage module 106 and/or a portion thereof. According to some embodiments, the at least one sensor 104 may be configured such that the collected signal may have a resolution of at least one millisecond, at least five milliseconds, at least 10 milliseconds, at least 50 milliseconds, at least 100 milliseconds, or any range therebetween. Each possibility is a separate embodiment.

According to some embodiments, the one sensor 104 may be configured to send the collected signals to a receiver, or receiving system. According to some embodiments, the receiver or receiving system may be in communication with any one or more of the processor 102, the at least one sensor 104, and/or the storage module 106. According to some embodiments, the receiver system may be configured to receive data associated with the movements of the cattle or cow, or in other words, the collected signals of the at least one sensor 104. According to some embodiments, the receiver system may be configured to receive data associated with the movements of a plurality of cattle or cows, or in other words, the receiver may be configured to receive a plurality of collected signals from a plurality of collars and/or ear-tags. According to some embodiments, the data from collars and eat-tags may be comparable, or in other words, data received from a collar of one cow can be compared with data received from an ear-tag of a different cow.

According to some embodiments, and as described in greater detail elsewhere herein, the receiver may receive data collected by the at least one sensor 104 using a method for sending data from collars (and/or ear-tags) of cattle in large groups. According to some embodiments, the processor may be configured to send the collected signals, from the collar (and/or ear-tag) to the receiver, based on a predetermined sending mechanism (such as described in FIG. 2). According to some embodiments, the at least one sensor 104 may be configured to send the receiver the collected signals at predetermined time intervals. According to some embodiments, the at least one sensor 104 may be configured to send the collected signals to the storage module 106.

According to some embodiments, the storage module 106 may include a collar (and/or ear-tag) storage 108 portion embedded in the collar of the cow. According to some embodiments, the collar (and/or ear-tag) storage 108 may be configured to store data (or signals) received from the at least one sensor 104. According to some embodiments, the collar (and/or ear-tag) storage 108 may be configured to store up to a week of data received from the at least one sensor 104. According to some embodiments, the collar (and/or ear-tag) storage 108 may be configured to store data collected by the sensor 104 before it is sent to the receiver. According to some embodiments, and as described in greater detail elsewhere herein, the collar (and/or ear-tag) storage 108 may be configured to store data collected by the sensor 104 until it can be sent to the receiver. For example, if the system 100 detects a used communication line, meaning that the collected signals cannot be sent to the receiver at the moment, the collected signals will be stored in the collar (and/or ear-tag) storage 108.

Figure 2:
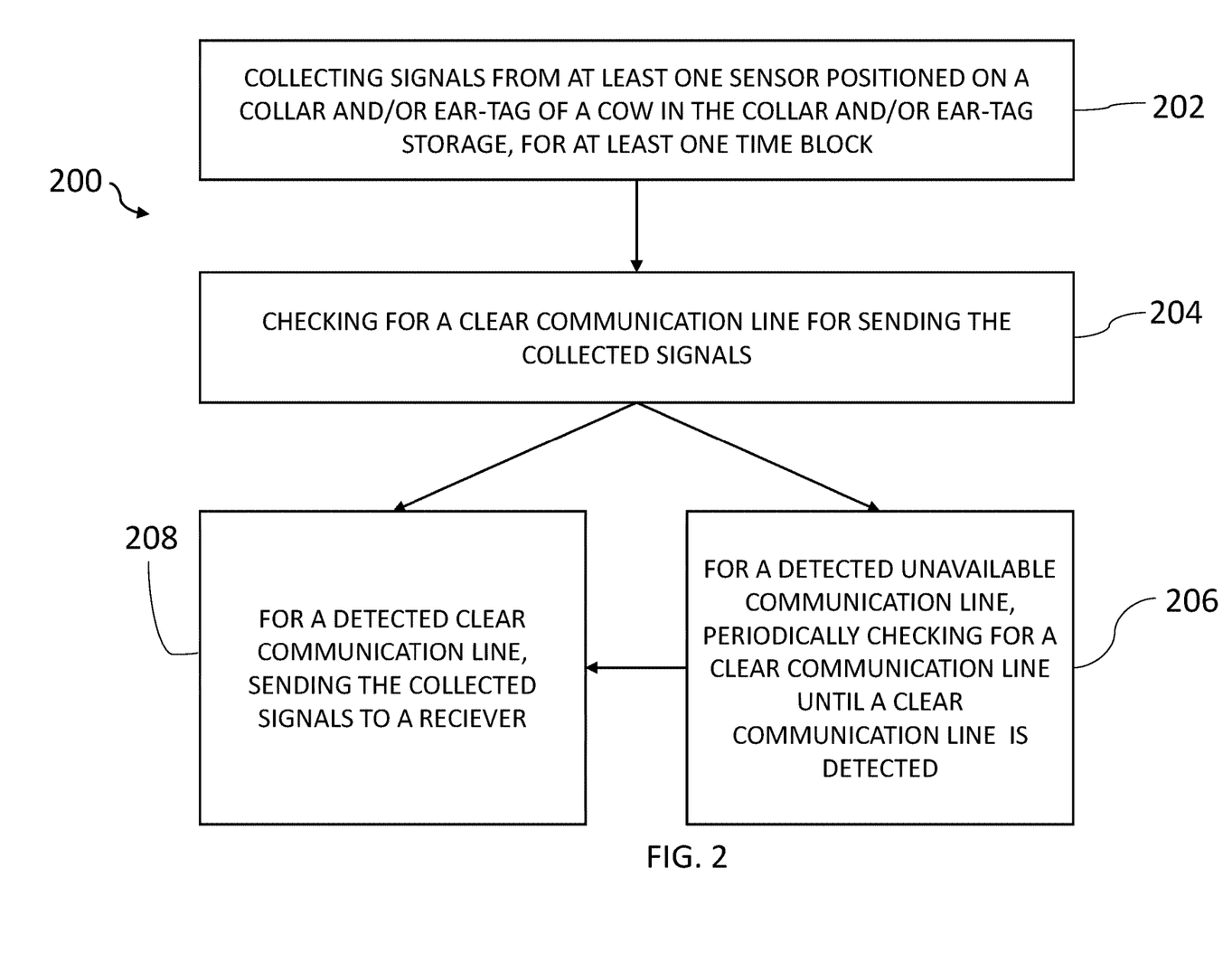
FIG. 2 is a flowchart of functional steps in a method for sending data from collars and/or ear-tags of cattle in large groups, in accordance with some embodiments of the present invention.

Reference is made to FIG. 2, which shows a flowchart of functional steps in a method for sending data from collars and/or ear-tags of cattle in large groups, in accordance with some embodiments of the present invention. According to some embodiments, the storage module may have stored thereon a program code, or one or more algorithms 112. According to some embodiments, the one or more algorithms may be configured to implement the method 200 as described in FIG. 2.

According to some embodiments, at step 202, the method 200 may include collecting signals from at least one sensor positioned on a collar (and/or ear-tag) of a cow in the collar (and/or ear-tag) storage, for at least one time block. According to some embodiments, at step 204, the method 200 may include checking for a clear communication line for sending the collected signals. According to some embodiments, at step 206, the method 200 may include, for a detected unavailable communication line, periodically checking for a clear communication line until a clear communication line is detected. According to some embodiments, at step 208, the method 200 may include, for a detected clear communication line, sending the collected signals to a receiver (or receiving system).

According to some embodiments, the method 200 may be configured to manage sending the collected signals of a plurality of cows to one or more receivers (or receiving systems). According to some embodiments, the method 200 may be configured to send collected signals of a plurality of cows such that no data (or signals) is lost due to unavailable communication lines (or used communication lines). Advantageously, implementing method 200 enables sending the signals collected from a plurality of collars (and/or ear-tags) to a single receiver without losing data by having different collars (and/or ear-tags) communicate with the receiver at different times.

According to some embodiments, at step 202, the method 200 may include collecting signals from at least one sensor positioned on a collar (and/or ear-tag) of a cow in the collar (and/or ear-tag) storage, for at least one time block. According to some embodiments, the signals may be collected in the collar (and/or ear-tag), such as, for example, in the collar (and/or ear-tag) storage. According to some embodiments, the method 200 may include labeling the collected data as being associated with a specific time block. According to some embodiments, the time block may be about 30 seconds, 1 minute, 2 minutes, 5 minutes, 7 minutes, 10 minutes, 13 minutes, 15 minutes, 25 minutes, or any range therebetween. Each possibility is a separate embodiment.

According to some embodiments, the method may include sending, using the processor, the collected signals. According to some embodiments, the processor may be configured to send the collected signals from the collar (and/or ear-tag) to the receiver. According to some embodiments, the method may include sending the collected signals from the collar (and/or ear-tag) to the receiver every predetermined time period. According to some embodiments, the predetermined time period may be about 3 minutes, 5 minutes, 10 minutes, 30 minutes, 1 hour, 3 hours, 24 hours, or any range therebetween. Each possibility is a separate embodiment.

According to some embodiments, sending the collected signals to the receiver may include checking if a communication line between the processor (or collar and/or ear tag) and the receiver is free (or available). According to some embodiments, an unavailable communication line may be caused by other collars (and/or ear tags) sending collected signals to the same receiver. According to some embodiments, an unavailable communication line may be caused due to lost communication between the processor (or collar and/or eat tag) and the receiver, i.e., for example, if the cow is out of range of the receiver (or has travelled too far away from the receiver).

According to some embodiments, at step 204, the method 200 may include checking for a clear communication line for sending the collected signals. According to some embodiments, at step 208, the method 200 may include, for a detected unavailable communication line, periodically checking for a clear communication line until a clear communication line is detected. According to some embodiments, the method may include checking for a communication line at least after each time block. According to some embodiments, the method may include saving the collected signals in packets, wherein one or more packets may be associated with a time block in which the signal was collected. According to some embodiments, after collecting the signals for a single time block, the method may include saving the collected signals in one or more packets in the collar (and/or ear-tag) storage. According to some embodiments, the method may include, for a detected unavailable communication line, saving the collected signals associated with one or more time blocks as one or more packets in the collar (and/or ear-tag) storage until a clear communication line is detected.

According to some embodiments, at step 206, the method 200 may include, for a detected clear communication line, sending the collected signals to the receiver (or receiving system). According to some embodiments, sending the collected signals to the receiver may include sending one or more packets from the collar (and/or ear-tag) storage to the receiver. According to some embodiments, the method may include sending, with the one or more packets, a flag indicating that there are still more packets to be sent to the receiver (or in other words, a binary indicator that the communication line should be maintained between the collar (and/or ear-tag) storage and the receiver). According to some embodiments, for a flag indicating that more packets are to be sent, the method may include maintaining the communication line between the collar (and/or ear-tag) storage and the receiver. According to some embodiments, the method may include sending a flag indicating that no more packets will be sent, with the last sent packet. According to some embodiments, the method may include disconnecting the communication line between the collar (and/or ear-tag) storage and the receiver after receiving a flag indicating that no more packets will be sent.

According to some embodiments, the method may include sending, with the first packet of the one or more packets, a flag indicating a number of packets that are going to be sent to the receiver from the collar (and/or ear-tag) storage. According to some embodiments, the method may include disconnecting the communication line between the collar (and/or ear-tag) storage and the receiver after the indicated number of packets has been sent. According to some embodiments, the method may include erasing the one or more packets from the collar (and/or ear-tag) storage once the one or more packets are sent to the receiver.

According to some embodiments, the system may be configured to receive the collected signals using a receiver (or receiving system). According to some embodiments, the method may include analyzing the received signals using one or more algorithms, such as algorithms 112.

Figure 3:
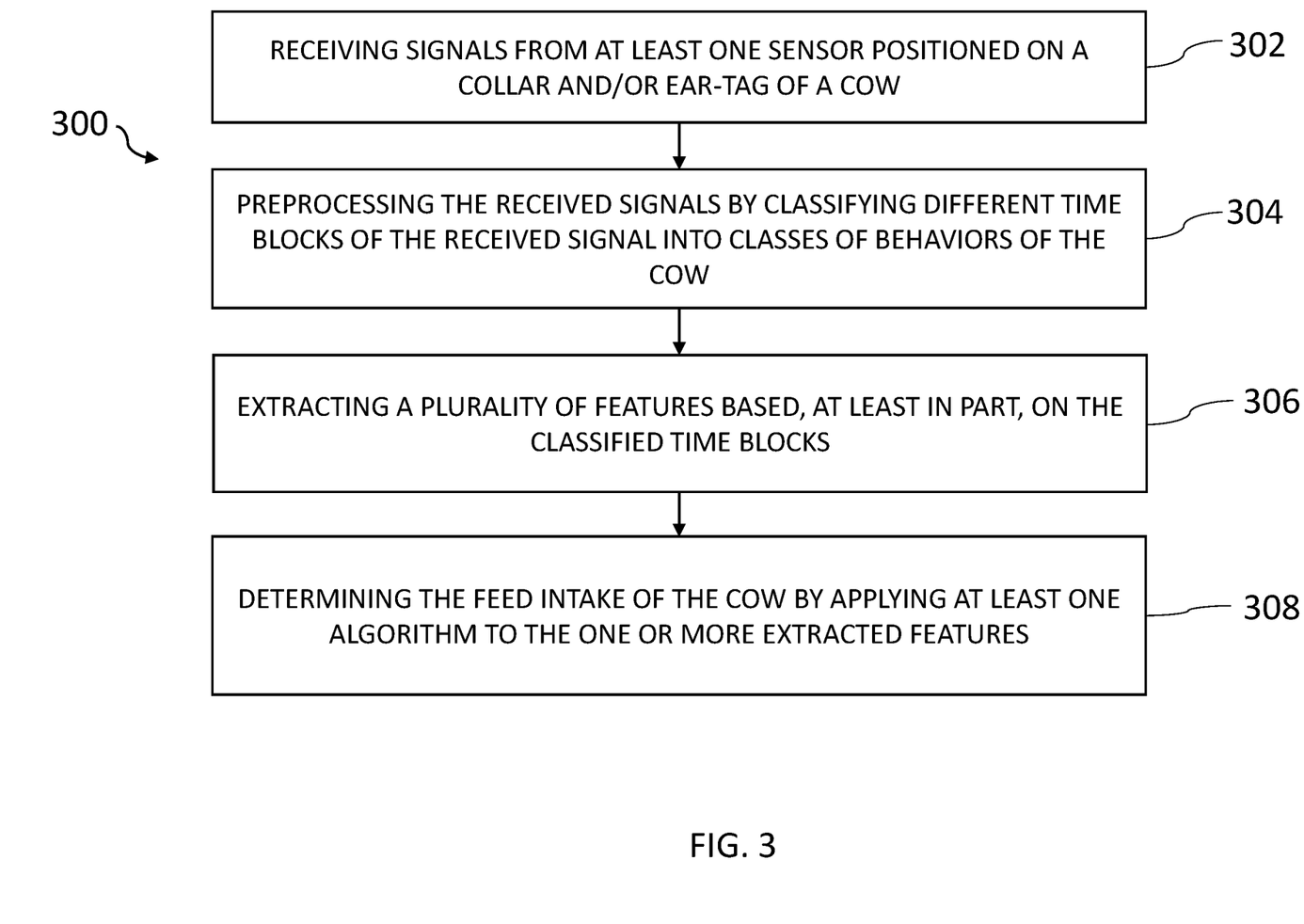
FIG. 3 is a flowchart of functional steps in a method for determining feed intake, in accordance with some embodiments of the present invention.

Reference is made to FIG. 3, which shows a flowchart of functional steps in a method for determining feed intake, in accordance with some embodiments of the present invention. According to some embodiments, the one or more algorithms 112 may be executable by the processor to implement the method 300 as depicted in FIG. 3.

According to some embodiments, at step 302, the method 300 may include receiving signals from at least one sensor positioned on a collar (and/or ear-tag) of a cow. According to some embodiments, at step 304, the method 300 may include preprocessing the received signals by classifying different time blocks of the received signal into classes of behaviors of the cow. According to some embodiments, at step 306, the method 300 may include extracting a plurality of features based, at least in part, on the classified time blocks. According to some embodiments, at step 308, the method 300 may include determining the feed intake of the cow by applying at least one algorithm to the one or more extracted features.

According to some embodiments, the method may include receiving signals from at least one sensor positioned on a collar (and/or ear-tag) of a cow, such as, the collected signals as described hereinabove. According to some embodiments, the collected signals may be the same signals as the received signals, or in other words, once the collected signals are received by the receiver (or receiving system), the signals may be referred to as the received signals.

According to some embodiments, the received signals may include data associated with the kinematics of the cow.

According to some embodiments, the received signals may include data associated with any one or more of the X-axis movement, Y-axis movement, and Z-axis movement, or any combination thereof. Each possibility is a separate embodiment. According to some embodiments, the received signals may be received, by the receiver, at intervals of one or more predetermined time periods, such as described in greater detail elsewhere herein. According to some embodiments, the received signals may be received, by the receiver, at intervals of about 3 minutes, 5 minutes, 10 minutes, 30 minutes, 1 hour, 3 hours, 24 hours, or any range therebetween. Each possibility is a separate embodiment.

According to some embodiments, the method may include saving data associated with each cow in a database. According to some embodiments, the data may include the received signals as well as other data associated with the cow. According to some embodiments, the database may include a timeline, the timeline being composed of a plurality of time blocks. According to some embodiments, the time blocks may be organized in chronological order. According to some embodiments, each of the received signals is associated with a time block, and each time block may be saved in the database such that the data in the database consists of a continuous data stream associated with the movements (or kinematics) of the cow.

According to some embodiments, the database may include providing an accurate time stamp associated with each time block (or in other words, labeling the received signals with a time stamp, wherein each time stamp is configured to identify the time in which the time block has begun). According to some embodiments, the time stamp may be different than the time stamp received with the received signals, due to an accurate clock in the at least one sensor and/or the collar (and/or ear-tag). The clock in the least one sensor and/or the collar (and/or ear-tag) may be unreliable and/or inaccurate due to energy conservation methods. Thus, labeling the received signals with accurate time stamps avoids the need of having an accurate clock located in the collar (and/or ear-tag) and/or at least one sensor. Advantageously, having an accurate time stamp associated with the received signals enables the data received from the sensor to be compared to other cows during the real time in which the data was received, thus enabling more accurate calculations of the feed intake. According to some embodiments, the method may include receiving a plurality of packets associated with a plurality of times blocks at once, and labeling the plurality of time blocks retroactively and accurately by reading their relative time (or the time associated with each packet in relation to the other packets received from the same collar (and/or ear-tag) or sensor).

According to some embodiments, the method may include converting the received signal to a representation in the frequency domain. According to some embodiments, the method may include applying one or more Fourier transform algorithms to the received signals. According to some embodiments, the method may include determining one or more frequencies within the received signals. According to some embodiments, the method may include determining one or more frequencies within the received signals for each time block. According to some embodiments, the method may include determining one or more frequencies within the received signals for each time block separately. According to some embodiments, the continuous data stream associated with movements of the cow that is saved in the database may include the determined frequencies (as a function of time). According to some embodiments, the frequencies may range between 0.5 GHz and 4 GHz. According to some embodiments, the frequencies may range between 1 GHz and 3 GHz. According to some embodiments, the frequencies may range between 1 GHz and 2 GHz. According to some embodiments, the frequencies may range between 2 GHz and 3 GHz. Each possibility is a separate embodiment.

According to some embodiments, the method may include calculating an average frequency for each time block. According to some embodiments, the method may save, in the database, the average frequency of each time block separately. For example, for a time block of 1.5 minutes, the database will have saved therein the average frequency of every 1.5 minutes. According to some embodiments, the method may include calculating a variance for each time block. According to some embodiments, the method may include saving, in the database, the variance of each time block separately.

According to some embodiments, the method may include receiving metadata associated with the cow. According to some embodiments, the method may include receiving the metadata from a user via a user interface module, such as the user interface module 114 described hereinabove. According to some embodiments, the method may include storing, within the database, metadata associated with the cow.

According to some embodiments, the metadata may include any one or more of the age of the cow, health status of the cow, profile of the cow, weight of the cow, and type of food being consumed by the cow and/or the cow group, the number of calves the cow has given birth to, how long it takes the cow to get pregnant, and the group number of the cow group, or any combination thereof. Each possibility is a separate embodiment. According to some embodiments, the metadata may include environmental parameters. According to some embodiments, the health status of the cow may include any one or more of the pregnancy status of the cow, amount of milk produced by the cow, milk composition of the milk produced by the cow, number of days since last calving, milking status of the cow and reported injuries of the cow, or any combination thereof. Each possibility is a separate embodiment.

According to some embodiments, the cow group may refer to the group in which the cow is physically placed, such as the herd in which the cow is in. According to some embodiments, the cow group may refer to the shed in which the cow is placed.

According to some embodiments, the milking status of the cow may refer to where the cow is currently in the milking or lactation cycle. According to some embodiments, the milking status may include a status such as "dry" or "heifer".

According to some embodiments, the number of calves the cow has given birth to may refer to the total number of calves the cow has given birth to, and/or the number of times the cow has given birth, and/or the number of calves that the cow has birthed in each birth, or any combination thereof. Each possibility is a separate embodiment.

According to some embodiments, the pregnancy status of the cow may include whether the cow is pregnant, stage of pregnancy, the sex of the fetus, the number of fetuses, a health status of the fetus/fetuses, or any combination thereof. Each possibility is a separate embodiment.

According to some embodiments, the profile of the cow may include any data the user has on the cow that may not be associated with other metadata labels, such as, for example, a number of days which the cow was lost or far away.

According to some embodiments, the environmental parameters may refer to inputted and/or otherwise received data associated with the environment the cow is in, such as, for example, the weather, season of the year, temperature, living conditions, and the like.

According to some embodiments, the data associated with the milk produced by the cow may include any one or more of the amount of milk produced by the cow, milk composition of the milk produced by the cow, and number of days since last calving, or any combination thereof. Each possibility is a separate embodiment. According to some embodiments, the data associated with milk produced by cow may be inputted by a user and/or received from a milk sensor. According to some embodiments, the milk sensor may measure yield, fat, protein, and/or any combination thereof. According to some embodiments, the milk sensor may include a spectrometer. According to some embodiments, the milk sensor may be configured to detect the amount of total fat (or total fatty acids) in the milk produced by the cow, the amount of saturated fat in the milk produced by the cow, the amount of unsaturated fat in the milk produced by the cow, amount of casein in the milk produced by the cow, amount of lactose in the milk produced by the cow, or any combination thereof. Each possibility is a separate embodiment.

According to some embodiments, the database may be organized by a numbering system in which each cow is numbered, by a numbering system in which each herd is numbered, by a numbering system in which each shed is numbered, by the type of food the cow is receiving, by the health status of the cow, by the pregnancy status of the cow, and the like, or any combination thereof. Each possibility is a separate embodiment.

According to some embodiments, at step 304, the method 300 may include preprocessing the received signals by classifying different time blocks of the received signal into classes of behaviors of the cow. According to some embodiments, the method may include preprocessing the determined frequencies of each time block. According to some embodiments, the preprocessing may include classifying each time block of the cow into classes of behaviors of the cow. According to some embodiments, the method may include classifying each time block of the cow into classes of behaviors of the cow by applying the frequency of each time block to one or more classification algorithms. According to some embodiments, the method may include classifying the time blocks based, at least in part, on the variance of the frequency of the signal within the time blocks.

According to some embodiments, the method may include applying a model that comprises the more or more classifiers. According to some embodiments, the model may include one or more classifiers configured to classify the time blocks as any one or more classes of behaviors of the cow. According to some embodiments, the model may include one or more classifiers configured to classify the time blocks based, at least in part, on the frequency of the signal within the time blocks, the variance of the frequency, one or more frequencies associated with other time blocks (that are not being classified), one or more previous classifications of one or more other time blocks, or any combination thereof. Each possibility is a separate embodiment. According to some embodiments, the model may include one or more Hidden Markov model (HMM). According to some embodiments, the model may include a classifier configured to use the HMM. According to some embodiments, the classifier may be configured to classify the time blocks based, at least in part, on received data from the at least one sensor. According to some embodiments, the classifier may be configured to classify the time blocks based, at least in part, on the extracted features.

According to some embodiments, the method may include classifying each time block of the cow into classes of behaviors of the cow by applying the variance of each time block to one or more classification algorithms. According to some embodiments, for a variance of the frequency of the signal that is above a predetermined threshold, the time block may be classified as eating time block. According to some embodiments, for a variance of the frequency of the signal that is below a predetermined threshold, the time block may be classified as ruminating time block.

According to some embodiments, the classification algorithm may include one or more machine learning models. According to some embodiments, the classification algorithm may include any one or more of a logistic regression algorithm, Naive Bayers algorithm, k-nearest neighbors (k-NN) algorithm, decision tree algorithm, support vector machine (SVM) algorithm, hidden Markov models, boosting algorithm(s) (e.g., for example, adaptive boosting, gradient tree boosting, XGBoost, and the like), linear regression algorithm, decision tree algorithm, K-means algorithm, random forest algorithm, or any combination thereof. Each possibility is a separate embodiment.

According to some embodiments, the one or more classification algorithm may be configured to classify each time block as being associated with one or more classes of behaviors of the cow. According to some embodiments, the classes of behaviors may include any one or more of eating, ruminating, walking, walking pace, activity (such as, for example, jumping), breathing rates, or any combination thereof. Each possibility is a separate embodiment.

According to some embodiments, the breathing rate classification may refer to having a breathing rate above or below a predetermined threshold. According to some embodiments, the breathing rate may be associated with other health conditions of the cow, such as, for example, if the cow is experiencing heat stress.

According to some embodiments, the method may include clustering the time blocks of each cow, wherein the clusters are associated with a classification of one or more behavior of the cow. According to some embodiments, the method may include separating between clusters associated with rumination of the cow and clusters associated with eating of the cow.

According to some embodiments, the method may include determining that a cluster in which the time blocks are classified as eating behavior, is an eating time block. According to some embodiments, the method may include clustering a plurality of eating time blocks into one or more meal time block. According to some embodiments, the method may include identifying eating time blocks that are outside (or separate of) the meal time block, or in other words, time blocks that may be outlier and regarded as non-eating times even though their frequency and/or variance may be similar to other eating time blocks of the cow.

According to some embodiments, the meal time block may include one or more time blocks that are not classified having eating behavior. For example, sometimes during a meal the cow may have breaks between chewing the food. In situations in which there may be breaks between eating time blocks, the method may include identifying some of the time blocks within the meal as eating-breaks, if the meal is still taking place and the time block is not classified as an eating behavior.

According to some embodiments, at step 306, the method 300 may include extracting a plurality of features based, at least in part, on the classified time blocks. According to some embodiments, the method may include implementing feature construction and/or feature selection techniques. According to some embodiments, the method may include extracting a plurality of features from any one or more of the frequencies of the time blocks, the variance of the time blocks, the number of time blocks in a specific cluster associated with a specific behavior (or classification), the ratios between specific clusters, the metadate associated with the cow, data associated with other cows in the same group, herd, and/or shed, health status of the cow, data associated with the milk production of the cow, and/or any combination thereof. Each possibility is a separate embodiment. According to some embodiments, the features may be based on metadata associated with the cow. According to some embodiments, the features may be based on the classified time blocks associated with the cow. According to some embodiments, the features may be based on a combination of metadata associated with the cow and the classified time blocks associated with the cow.

According to some embodiments, the features may be extracted, selected and/or constructed using one or more algorithms. According to some embodiments, the method may include applying the time blocks and/or the metadata of the cow to an algorithm configured to extract one or more features therefrom. According to some embodiments, the algorithm may include one or more machine learning model. According to some embodiments, the algorithm may be devoid of a machine learning model. According to some embodiments, the algorithm may include one or more models that are functions produced by one or more machine learning models.

According to some embodiments, at step 308, the method 300 may include determining the feed intake of the cow by applying at least one algorithm to the one or more extracted features. According to some embodiments, the method may include applying, to the extracted features, one or more algorithms configured to calculate the feed intake. According to some embodiments, calculating the feed intake may include calculating the amount of consumed food the cow has taken in. According to some embodiments, the algorithm may be configured to calculate the amount of time the cow has eaten and/or the eating pace (or chewing rate) of the cow. According to some embodiments, the algorithm may be configured to calculating the feed intake without calculating the rumination of the cow.

According to some embodiments, determination of the feed intake of the cow can be implemented by applying at least one algorithm to the one or more extracted features of the data in the meal time block. According to some embodiments, the algorithm may be configured to identify the amount of food consumed by the cow in one or more meal time blocks of the cow. According to some embodiments, the method may include applying the algorithm to one or more meal time blocks of the cow and the extracted features.

According to some embodiments, the algorithm may be configured to rank (or score) the feed intake of the cow in relation to the feed intake of other cows in a same group that the cow is part of, such as the cow group and/or a group of cows having a same metadata parameter. According to some embodiments, the algorithm may be configured to rank the (or score) the feed intake of the cow in relation to the feed intake of other cows in the same cow group as the cow (such as, for example, the herd or a specific shed). According to some embodiments, the algorithm may be configured to rank the (or score) the feed intake of the cow in relation to the feed intake of other cows having one or more of a same metadata parameter, such as, for example, a same pregnancy status, health status, milk production data, and the like. For example, the feed intake of a pregnant cow may be ranked in relation to the feed intake of other pregnant cows. For example, the feed intake of a pregnant cow having twins may be ranked in relation to the feed intake of other pregnant cows having twins. For example, the feed intake of a limping cow may be ranked in relation to the feed intake of other limping cows. For example, the feed intake of a dry cow may be ranked in relation to the feed intake of other dry cows.

According to some embodiments, the method may include receiving inputted data from a user, associated with the amount of food provided to the cow group (e.g., the herd or shed). According to some embodiments, the data associated with the amount of food provided to the cow group may include the weight of the food. According to some embodiments, the data associated with the amount of food provided to the cow group may include the type of the food. According to some embodiments, the data associated with the amount of food provided to the cow group may include the price of the food. According to some embodiments, the data associated with the amount of food provided to the cow group may include the percent of dry matter within the feed. According to some embodiments, the algorithm may be configured to output an amount of food eaten by the cow based, at least in part, on the inputted data associated with the amount of food provided to the cow group.

According to some embodiments, the algorithm may be configured to output the amount of food the cow has consumed daily. According to some embodiments, the algorithm may be configured to output the amount of food the cow has consumed on in a week (or every week). According to some embodiments, the algorithm may be configured to output the amount of food the cow has consumed monthly.

In the description and claims of the application, the words "include" and "have", and forms thereof, are not limited to members in a list with which the words may be associated.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer (or cloud) may be connected to the user's computer through any type of network, including a local area network (LAN) or a wide area network (WAN), or the connection may be made to an external computer (for example, through the Internet using an Internet Service Provider) including wired or wireless connection (such as, for example, Wi-Fi, BT, mobile, and the like). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for determining an amount of food consumed by a cow, the system comprising:
at least one sensor configured to be positioned on a collar and/or ear-tag of a cow, wherein the sensor is configured to collect data associated with head movements of the cow;
a processor in communication with a memory module, the memory module having stored thereon program code, the program code executable by the processor to:
receive signals from the at least one sensor;
preprocess the received signals by classifying different time blocks of the received signal into classes of behaviors of the cow;
extract a plurality of features based, at least in part, on the classified meal time blocks associated with eating behavior, wherein at least one algorithm is applied to at least one of the extracted features to rank the amount of food consumed by each cow in relation to the amount of food consumed by other cows in the same group of cows to which the cow belongs;
receive input data associated with the amount of food provided to the group of cows; and
calculate the amount of food consumed by the cow based on the one or more extracted features, wherein the amount of food calculated is based at least on the rank of the amount of food consumed by each cow in relation to the amount of food consumed by other cows in the same group to which the cow belongs and on the input data associated with the amount of food provided to the group of cows.

2. The system of claim 1, wherein the processor is further configured to calculate the amount of food without calculating the rumination of the cow.

3. The system of claim 1, wherein the processor is further configured to determine one or more of the eating time and the eating pace of the cow, and wherein calculating the amount of food consumed by the cow is based, at least in part, on one or more of the eating time and the eating pace of the cow.

4. The system of claim 1, further comprising receiving metadata associated with the cow and/or a group of the cow.

5. The system of claim 4, wherein the metadata comprises any one or more of the age of the cow, number of days from the cow's calving, health status of the cow, profile of the cow, weight of the cow, and type of food being consumed by the cow and/or the group, the number of calves the cow has given birth to, how long it takes the cow to get pregnant, and the group number of the group of the cow.

6. The system of claim 5, wherein the health status of the cow comprises any one or more of the pregnancy status of the cow, amount of milk produced by the cow, milk composition of the milk produced by the cow, number of days since last calving, and reported injuries of the cow.

7. The system of claim 1, wherein the system is further configured to convert the received signal to a representation in the frequency domain.

8. The system of claim 1, wherein the sensor comprises an accelerometer, and wherein the signal is associated with the kinematics of the cow.

9. The system of claim 1, wherein the received signal comprises a resolution of at least one millisecond.

10. The system of claim 1, wherein the length of each of the time blocks comprises about 30 seconds to 5 minutes.

11. The system of claim 1, wherein the classes of behaviors comprise any one or more of eating, ruminating, walking, jumping, breathing rate, or any combination thereof.

12. The system of claim 1, wherein the storage module is configured to store the received signals in one or more clusters, wherein each cluster is associated with a classes of behavior of the cow.

13. The system of claim 1, wherein the storage module is configured to store the received signals in the collar and/or ear-tag.

14. The system of claim 13, wherein the processor is configured to send the received signals, from the collar and/or ear-tag to a receiver, every predetermined time period.

15. The system of claim 14, wherein the predetermined time period comprises between about 5 minutes to about 24 hours.

16. The system of claim 1, wherein the processor is configured to send the received signals, from the collar and/or ear-tag to a receiver, based on a predetermined sending mechanism.

17. The system of claim 1, wherein the memory module or a portion thereof is located on the collar and/or ear-tag.

18. A method for measuring an amount of food consumed by a cow, the method comprising:
receiving signals from at least one sensor positioned on a collar and/or ear-tag of a cow;
preprocessing the received signals by classifying different time blocks of the received signal into classes of behaviors of the cow;
extracting a plurality of features based, at least in part, on the classified meal time blocks associated with eating behavior, wherein at least one algorithm is applied to at least one of the extracted features to rank the amount of food consumed by each cow in relation to the amount of food consumed by other cows in the same group of cows to which the cow belongs;
receiving input data associated with the amount of food provided to the group of cows; and
determining the amount of food consumed by the cow by applying at least one algorithm to the one or more extracted features, wherein the amount of food determination is based at least on the rank of the amount of food consumed by each cow in relation to the amount of food consumed by other cows in the same group to which the cow belongs and on the input data associated with the amount of food provided to the group of cows.

19. The method of claim 18, wherein the amount of food consumed by the cow comprises the amount of food over a period of about one week.

20. The method of claim 18, wherein for a time block classified as eating, determining the amount of food by applying one or more machine learning modules to the time blocks classified as eating time blocks.

21. The method of claim 18, further comprising calculating a frequency from the received signal.

22. The method of claim 21, wherein the frequency is between 1 GHz and 2 GHz.

23. The method of claim 21, further comprising classifying the time blocks based, at least in part, on the variance of the frequency of the signal within the time blocks.

24. The method of claim 23, further comprising clustering a plurality of eating time blocks into one or more meal time block, and wherein determining the amount of food consumed by the cow comprises applying at least one algorithm to the one or more extracted features of the data in the meal time block.

25. The method of claim 18, wherein determining the amount of food comprises applying the extracted features to a machine learning algorithm.

26. The method of claim 18, Wherein determining the amount of food consumed by the cow by applying at least one algorithm to the one or more extracted features and one or more additional features.

27. The method of claim 26, wherein the additional features comprise any one or more of metadata of the cow and data associated with the milk produced by the cow, or any combination thereof.

28. The method of claim 27, wherein the metadata of the cow comprises any one or more of the age of the cow, health status of the cow, profile of the cow, weight of the cow, and type of food being consumed by the cow and/or the group, the number of calves the cow has given birth to, how long it takes the cow to get pregnant, and the group number of the group of the cow.

29. The method of claim 28, wherein the health status of the cow comprises any one or more of the pregnancy status of the cow and reported injuries of the cow.

30. The method of claim 27, wherein the data associated with the milk produced by the cow comprises any one or more of the amount of milk produced by the cow, milk composition of the milk produced by the cow, and number of days since last calving.

31. The method of claim 27, wherein the data associated with milk produced by cow comprises data inputted by a user and/or received from a milk sensor.

* * * * *